United States Patent [19]

Jahnke

[11] Patent Number: 4,710,838
[45] Date of Patent: Dec. 1, 1987

[54] MAGNETIC THIN-FILM HEAD FOR A RECORDING MEDIUM THAT CAN BE MAGNETIZED VERTICALLY

[75] Inventor: Andreas Jahnke, Forchheim, Fed. Rep. of Germany

[73] Assignee: Siemens Aktiengesellschaft, Munich, Fed. Rep. of Germany

[21] Appl. No.: 807,538

[22] Filed: Dec. 11, 1985

[30] Foreign Application Priority Data

Dec. 21, 1984 [DE] Fed. Rep. of Germany ....... 3446924

[51] Int. Cl.⁴ ............................................. G11B 5/127
[52] U.S. Cl. .................................. 360/125; 360/119; 360/122; 360/123
[58] Field of Search ................. 360/119, 120, 122–123, 360/125–127, 113–115

[56] References Cited

U.S. PATENT DOCUMENTS 4,353,102 10/1982 Kanai et al. .......................... 360/126
4,539,616 9/1985 Yuito et al. .......................... 360/125

FOREIGN PATENT DOCUMENTS 0012912 7/1980 European Pat. Off. .
0071489 2/1983 European Pat. Off. .
2924013 1/1980 Fed. Rep. of Germany .

OTHER PUBLICATIONS

"IEEE Trans. on Magnetics", vol. MAG-16, No. 1, Jan. 1980, pp. 71–76.
"Feinwerktechnik & Messtechnik", 88th Year, No. 2, Mar. 1980, pp. 53–59.
Siemens-Zeitschrift, vol. 52, No. 7, 1978, pp. 434–437.

*Primary Examiner*—John H. Wolff
*Attorney, Agent, or Firm*—Kenyon & Kenyon

[57] ABSTRACT

A magnetic thin-film head with layer-wise build-up on a nonmagnetic substrate for a recording medium which can be magnetized vertically, comprises a ring head-like conduction body for carrying magnetic flux having two magnet legs, of which the end pole pieces facing the recording medium have, respectively, a predetermined small width transverse to the direction of motion and change into widening leg parts a space being provided between the two magnet legs through which the turns of a write/read coil winding extend. A magnetic head having highly efficient write and read functions is thereby obtained. The vertical length (gap height h) of one of the two end pole pieces is relatively small, while the corresponding length (l) of the other end pole piece is several times the former, and a widening leg part of the magnet leg with the comparatively shorter vertical end pole piece is provided with a recess which extends along its center line lying in the conduction direction of the magnetic flux and extends at least approximately to the shorter end pole piece.

8 Claims, 3 Drawing Figures

MAGNETIC THIN-FILM HEAD FOR A RECORDING MEDIUM THAT CAN BE MAGNETIZED VERTICALLY

BACKGROUND OF THE INVENTION

The present invention relates to a magnetic thin-film head with layer-wise build-up on a nonmagnetic substrate for a recording medium which is provided with a magnetizable storage layer, into which information can be written along a track by perpendicular (vertical) magnetization, which magnetic head comprises a ring head-like magnetic conduction body for carrying magnetic flux and having two magnet legs, of which the end pole pieces facing the recording medium are arranged one behind the other as seen in the direction of motion of the head, and having a predetermined small mutual spacing, each having a predetermined small width transversely to the direction of motion, where widening leg parts follow these end pole pieces, and the magnet leg farther removed from the substrate is designed in its widening leg part leading to a greater distance relative to the magnet leg facing the substrate, so that, between the two magnet legs a correspondingly wide space is provided, through which the turns of a write/read coil winding extend. Such a magnetic head is known, for instance, from European Patent Application No. 0,012,912 A1.

The principle of vertical magnetization for storing information is generally known (see, for instance, "IEEE Transactions on Magnetics", Vol. MAG-16 No. 1, January 1980, pages 71 to 76; DE-OS No. 29 24 013 or the mentioned European Patent Application). For this principle, which is frequently also called vertical magnetization, special recording media in the form of rigid magnetic memory discs, flexible individual discs (floppy discs) or magnetic tapes are required. Such a recording medium has at least one magnetizable storage layer of predetermined thickness which contains a magnetically anisotropic material, usually a CoCr alloy. The axis of the so-called easy magnetization of this layer is directed perpendicularly to the surface of the medium. By means of a special magnetic head, the individual pieces of information can be written along a track as bits in successive sections, also called cells or blocks, by which the corresponding magnetization of the storage layer is written in. In practice, the magnetic flux reversals are generally used as information, i.e., the transitions from one direction of magnetization to an opposite one. The bits so obtained have a predetermined extent, also called wavelength, in the longitudinal direction of the track. This extent can be substantially smaller than the limit which is given with the principle of longitudinal (horizontal) storage by demagnetization. Thus, the information density in the recording medium can advantageously be increased according to the principle of vertical magnetization.

The magnetic write- and read heads known for the principle of longitudinal magnetization, i.e., heads by which the write as well as the read function can be executed, however, cannot be adopted directly for use with vertical magnetization. Although, if such heads are used, which in general have a ring-head-like shape, the conduction of the flux to form a circuit closed as far as possible with low magnetic resistance can be obtained also with the flux arrangement desired with the principle of vertical magnetization, it is difficult to generate a sufficiently strong write field at high bit densities and a correspondingly small gap width of the ring head.

One is therefore compelled to develop special magnetic write/read heads for the principle of vertical magnetization. A magnetic head suitable for this purpose, such as shown, for instance, in the European Patent Application mentioned above, has a conduction body of, in particular, ring-head-like shape for conducting the magnetic flux, applied to a nonmagnetic substrate. This conduction body comprises two magnet legs of approximately identical shape, of which the end pole pieces facing the recording medium are arranged one behind the other as seen in the direction of motion and having a predetermined small spacing from each other and each having a small predetermined width. The end pole pieces of these magnet legs change into leg parts which are widened transversely to the direction of motion of the head or transversely to the conduction direction of the magnetic flux, where the magnet head farther removed from the substrate is designed in its corresponding leg part for a greater distance with respect to the magnet leg facing the substrate. In this manner, a sufficiently wide space is obtained between the two magnet legs, through which the turns of a flat write and read coil winding extend. The ring head-like shape of the conduction body is utilized for the write function as well as for the read function of the magnetic head.

The individual parts of this known magnetic head are applied here by thin-film technology on the substrate in layers. This technology is generally known for write-/read heads (see, for instance, "Feinwerktechnik und Mestechnik", 88th Year, No. 2, March 1980, pages 53 to 59, or "Siemens-Zeitschrift", Vol. 52, No. 7, 1978, pages 434 to 437).

In the geometric design of the magnet legs of such magnetic heads, the following objectives are pursued, among other things:

The end pole pieces of the magnet legs should be made as thin as possible so that small bit patterns can be read and written.

In addition, a track width as narrow as possible is desired so that in this manner a high area density of the stored information is obtained.

By these requirements, the dimensions of a magnetic head with a shape similar to a ring head, fabricated in thin-film technology, are greatly reduced so that stray fields in the region of the adjacent end pole pieces can lead to short circuits in the magnetic flux. This affects the size of the write fields in front of the pole ends and the reading efficiency adversely. This effect is of importance particularly with the principle of vertical magnetization since with this principle, bit lengths of, for instance, 0.25 $\mu$m and track widths of, for instance 10 $\mu$m are sought and therefore, the magnetic energy of a bit is correspondingly small.

SUMMARY OF THE INVENTION

It is therefore an object of the present invention to improve the magnetic head mentioned above such that, for the mentioned bit dimensions, the write and read function can be assured with a relatively high efficiency.

The above and other objects of the present invention are achieved by a magnetic thin-film head comprising a layer-wise build-up on a nonmagnetic substrate for a recording medium which is provided with a magnetizable storage layer, into which information can be written along a track by perpendicular magnetization of the storage layer, the magnetic head comprising a ring head-like conduction body for carrying magnetic flux having two magnet legs, a first of the magnet legs being disposed on the substrate and the second being spaced from the first by a defined space, the magnet legs forming end pole pieces facing the recording medium arranged one behind the other as viewed in the direction of motion of the head, the end pole pieces having a predetermined small spacing therebetween and having a predetermined small width transverse to the direction of motion, the defined space between the magnet legs being substantially larger than the spacing between the end pole pieces, the second magnet leg being formed so as to provide the defined space, the turns of a write/read coil winding extending through the defined space, the end pole piece associated with the second magnet leg having a predetermined vertical length, the corresponding vertical length of the other end pole piece being at least twice as large as the vertical length of the end pole piece associated with the second magnet leg, the second magnet leg being formed with a leg part which has an increasing width in a region between the associated end pole piece and the region of the second magnet leg which defines the defined space, the leg part being provided with a recess which extends along a center line of the second magnet leg lying in the conduction direction of the magnetic flux and which reaches at least approximately to the end pole piece associated with the second leg.

Due to this special design of the magnetic head according to the invention, the areas of the two end pole pieces directly opposite each other are reduced to a minimum so that a short circuit of the magnetic flux line between these surfaces is accordingly made more difficult. Since further, the leg part, which recedes at an angle, of the second magnet leg further removed from the substrate becomes wide quickly and has a recess at its center, while the end pole piece of the first magnet leg facing the substrate underneath remains narrow in this region without change, also the surface parts of the magnet leg underneath, covered by the receding leg part must be kept small. Accordingly, at least in the regions with a small spacing, a reduction of the magnetic leakage flux between these parts of the two magnet legs is obtained due to this measure. This reduction of the magnetic stray flux causes an appreciable increase of the vertical write field, especially with small track widths, as well as also an improvement of the efficiency of the head in reading.

BRIEF DESCRIPTION OF THE DRAWINGS

The invention will be explained in greater detail in the following detailed description with reference to the drawings, in which.

DETAILED DESCRIPTION

Figure 1:
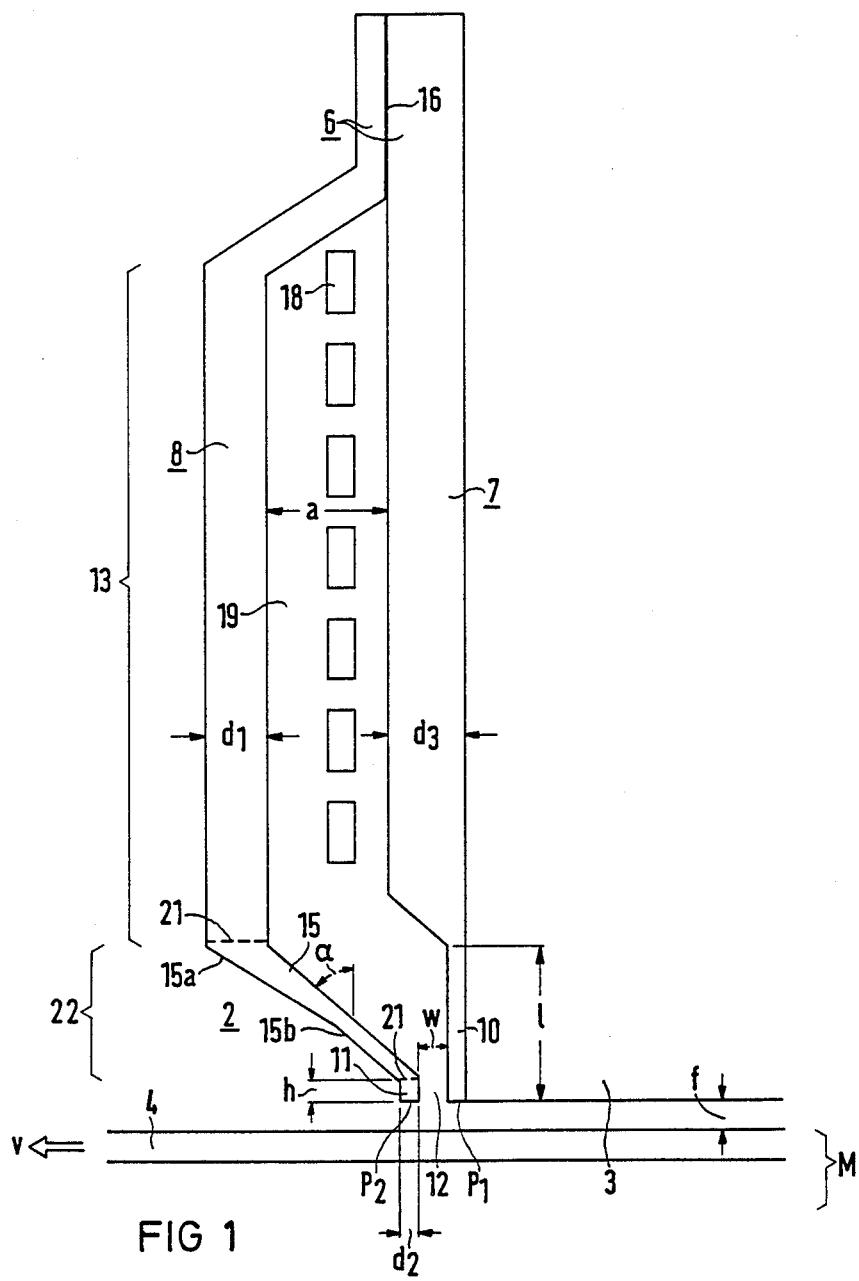
FIG. 1 shows an embodiment of a magnetic head according to the invention in a schematic longitudinal section.

With reference now to the drawings, in the magnetic head for writing and reading, detailed only in part in FIG. 1, a start is made from the ring head-like embodiments known per se with a layer-wise build-up produced in thin-film technology, for the principle of vertical magnetization (see, for instance, the above mentioned European Patent Application or the European Patent Application No. 0071 489-A2). The head, generally designated with 2 in the figure, is located on the flat side of a substrate 3 which forms the end or rear face of a customary element designated as an aerodynamic body, which is only indicated in the figure. This head can be guided relative to a recording medium M which is known per se and can be magnetized vertically, at a small flight altitude f of, for instance, 0.2 $\mu$m along a track. The recording medium M, for instance, a magnetic storage disc, has a storage layer 4, especially of a CoCr alloy which optionally can be connected on its side facing away from the magnetic head 2 to further layers, for instance, of a special NiFe alloy. The direction of motion relative to the head of the recording medium M conducted, for instance, under the head, is indicated by arrow v.

The magnetic head 2 contains a magnetic conduction body 6 carrying the magnetic flux, having two magnet legs 7 and 8. These legs are aligned largely and in particular, at their end pole pieces 10 and 11 facing the recording medium M, at least approximately perpendicularly to the surface of the recording medium and form there respective magnet poles $P_1$ and $P_2$. Between these two end pole pieces, an air gap 12 with an advantageously small longitudinal width w of less than 1 $\mu$m pointing in the direction of motion v, preferably of about 0.5 $\mu$m is formed. In a central region of the head, the spacing between the magnet legs 7 and 8 is increased over this gap width w, in that, for instance, the magnet leg 8 which is backwards with respect to the direction of motion, leads with a leg part 15 adjacent to the end pole piece 11 to a larger spacing a relative to the forward magnet leg 7 which is of straight design and is closest to the substrate 3. In this region, the magnet leg 8 has a thickness $d_1$ of approximately 4 $\mu$m. The inclined leg part 15 is made tapered with respect to its thickness inasmuch as its thickness decreases from the thickness $d_1$ of the magnet leg 8 to the substantially smaller thickness $d_2$ of the end pole piece 11 of, for instance, 1 $\mu$m. According to the embodiment shown, the leg part 15 has a correspondingly tapered section 15a and a section 15b with approximately constant thickness. The magnet leg 7 facing the substrate 3 has a thickness $d_3$ which corresponds, for instance, to the thickness $d_1$ of the magnet leg 8 in the region 13, except for its end pole piece 10 which has approximately the same thickness as the end pole piece 11. Outside the region 13, on the side facing away from the recording medium M, the magnet leg 8 is coupled to the magnet leg 7 in a connection region 16 in a manner known per se so that the ring head-like shape of the magnetic head 2 is obtained.

The magnetic head 2 further contains, in particular, a multilayer, flat coil winding 18 for the read function as well as for the write function according to the principle of vertical magnetization, the turns of which extend through the space 19 formed between the two magnet legs 7 and 8 in the central region 13.

According to the invention, the gap height h determined by directly adjacent surface-parallel regions of the two end pole pieces 10 and 11 is to be kept as small as possible in the vertical direction, i.e., perpendicularly to the surface of the recording medium M and should be in particular less than 2 $\mu$m and preferably at the most 1 μm. This is achieved by the provision that the outer magnet leg 8 changes already at this height into its leg part 15 which is further removed from the magnet leg 7, where the angle of inclination α is chosen as large as possible relative to the surface of the substrate 3 or the magnet leg 7 and is at least 40° and preferably at least 60°. In addition, this leg part 15 receding at an angle should be quickly increased in width transversely to the direction of motion v, and in addition, should comprise, along its center line or plane 20, pointing in the direction of the magnetic flux conduction, a recess 21 which comes close, at least approximately, to the associated end pole piece 11. This recess 21 is indicated in the presentation of FIG. 1 only by dotted lines. On the other hand, the end pole piece 10 of the magnet leg 7 facing the substrate 3, is to remain narrow without change in this magnetic head region designated with 22 between the end pole piece 11 and the region 13 for large distance, for instance, until the two magnet legs have approximately reached their maximum spacing a.

Only then is the magnet leg 7 advantageously widened also. Thus, advantageously at least twice and preferably at least five times the corresponding length of the shorter end pole piece 11 or the gap height h is advantageously chosen as the vertical length l of the longer end pole piece 10.

Figure 2:
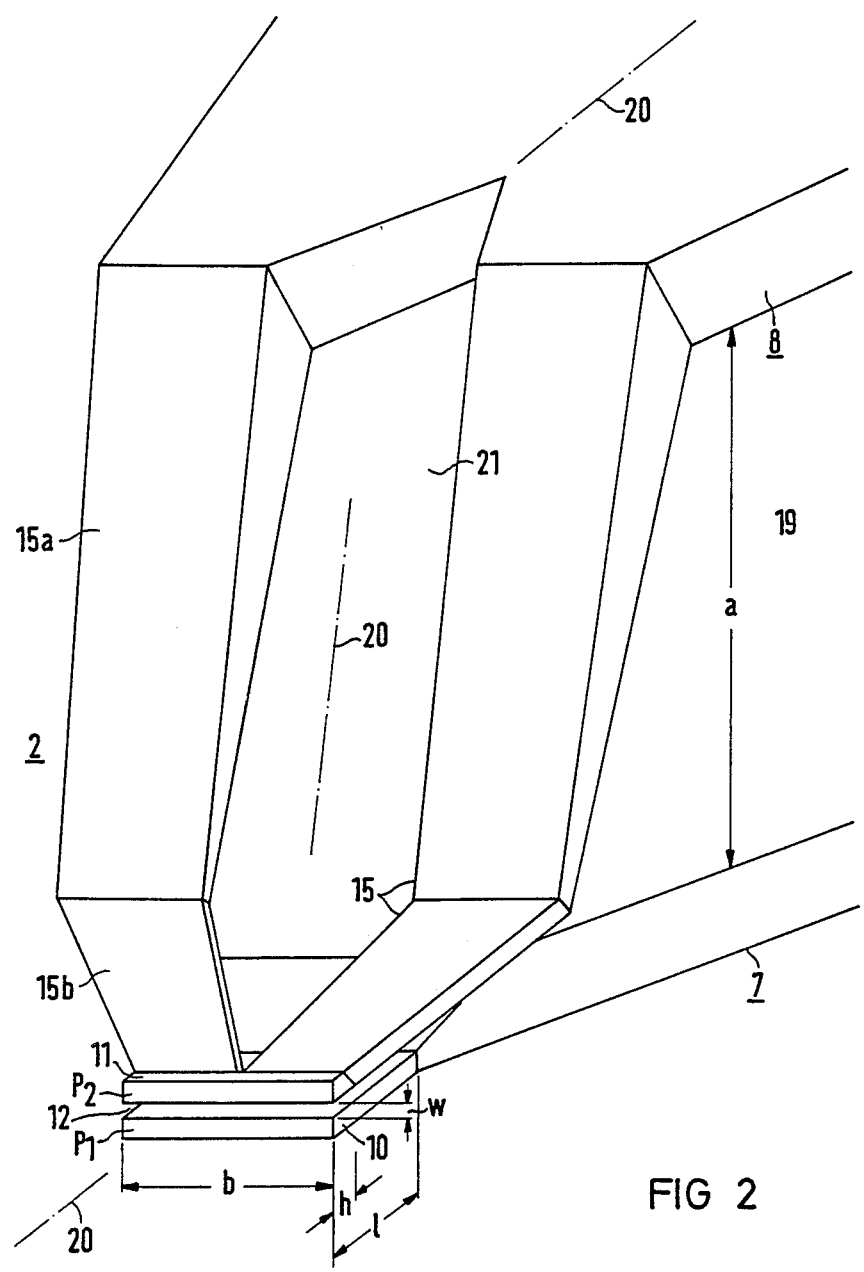
FIG. 2 shows an embodiment of a magnetic head according to the invention in a schematic oblique view.
Figure 3:
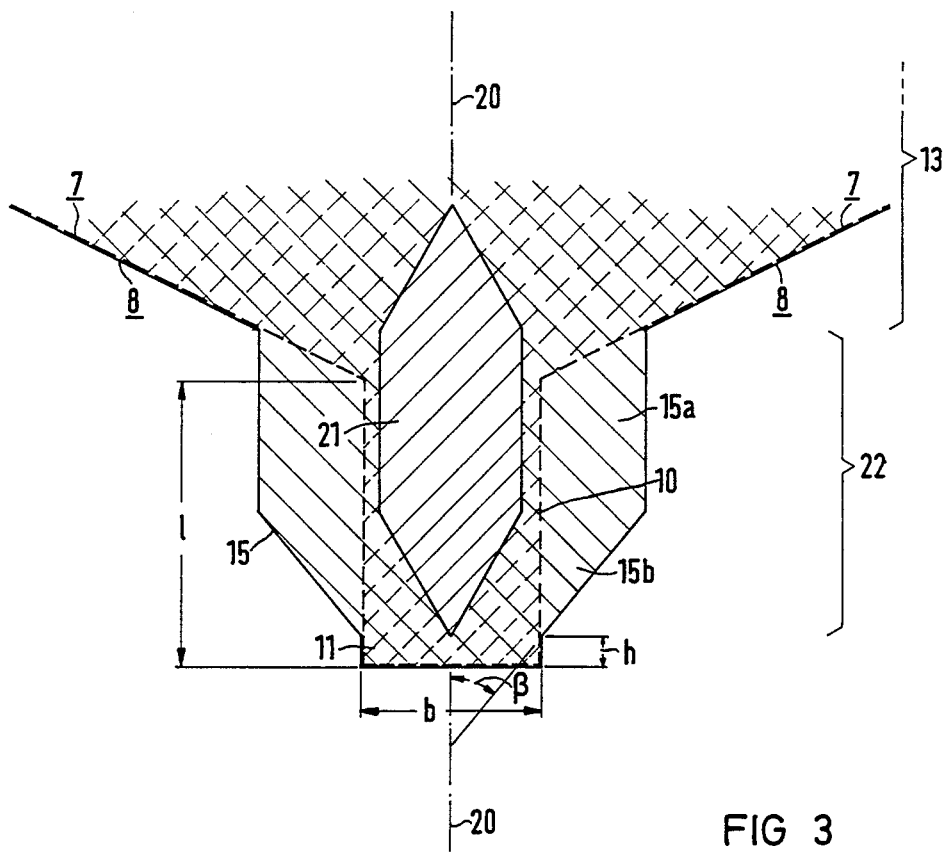
FIG. 3 shows an embodiment of a magnetic head according to the invention in a schematic top view. Corresponding parts are provided in the figures with the same reference symbols.

The design of the two magnet legs 7 and 8 of the magnetic head 2 according to the invention can be seen in detail from. FIGS. 2 and 3. In FIG. 3, the overlapping magnet legs are illustrated by hatching in different directions. It can be seen particularly from FIG. 3 that the aperture angle β which determines the widening of the leg part 15 transversely to the direction of motion v and is measured relative to the center plane 20 extending in the direction of motion or the direction of flux conduction is to be chosen as large as possible and is, for instance, at least 40° and preferably at least 60°. The central recess 21 then can be made large enough so that on the one hand only relatively small surface portions of the end pole piece 10 of the magnet leg 7 lying underneath overlap, and on the other hand, a sufficiently large material cross section for conducting the magnetic flux exists. In FIG. 3, the surface portions overlapping in this manner can be seen due to the resulting cross hatching. The gap resulting between the plane-parallel region of the end pole pieces 10 and 11 has advantageously a very small area b·h, where h is the gap height and b, the width of the end pole pieces 10 and 11 transversely to the direction of motion. This width b of the end pole pieces determining the track width can be, for instance, 10 μm.

The magnetic head according to the invention is advantageously fabricated in thin-layer or thin-film technology known per se. The substrate used for this purpose may comprise, for instance, TiC or $Al_2O_3$. For building up the magnet leg, thin magnetic layers of special alloys or magnetically soft amorphous materials of high permeability are applied to the substrate by sputtering, vapor deposition or electroplating and are separated from each other by nonmagnetic intermediate layers. The easy direction of magnetization can be induced, for instance, when the respective layer is applied, by an applied magnetic field. Generally, it is always perpendicular to the direction of the magnetic flux in the magnetic conduction body, i.e., substantially parallel to the surface of the recording medium M in the region of the magnet poles $P_1$ and $P_2$. The different grown layers are structured by techniques known per se such as photolithography, plasma-, ion beam- or wet chemical etching, and the magnet legs of the head are formed thereby. For making the coil winding provided for the write and read function, layers of Cu or Al or Au are deposited and structured appropriately. The individual insulating layers further required for the construction of the magnetic head, especially the gap layer, are not detailed in the figures for reasons of clarity.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A magnetic thin-film head comprising a layer-wise build-up on a nonmagnetic substrate for a recording medium which is provided with a magnetized storage layer, into which information can be written along a track by perpendicular magnetization of the storage layer, said magnetic head comprising a ring head-like magnetic conduction body for carrying magnetic flux having two magnet legs, a first of the magnet legs being disposed on the substrate and a second of the magnet legs being spaced from the first magnet leg by a defined space, the magnet legs forming end pole pieces facing the recording medium arranged one behind the other as viewed in the direction of motion of the head and medium, the end pole pieces having a predetermined small spacing therebetween and having a predetermined small width transverse to the direction of motion, said defined space between the magnet legs being substantially larger than the spacing between the end pole pieces, the second magnet leg being formed so as to provide the defined space, the turns of a write/read coil winding extending through said defined space, the end pole piece associated with the second magnet leg having a predetermined short vertical length, the corresponding vertical length of the other end pole piece being at least twice as large as said predetermined short vertical length of the end pole piece associated with the second magnet leg, the second magnet leg being formed with a leg part which has an increasing width in a region between the associated end pole piece and the region of the second magnet leg which defines said defined space, the leg part being provided with an aperture which extends along a center line of the second magnet leg lying in the conduction direction of the magnetic flux and reaches at least approximately to the end pole piece associated with the second leg.

2. The magnetic head recited in claim 1, wherein the vertical length of the longer end pole piece is at least 5-times the corresponding length of the shorter end pole piece.

3. The magnetic head recited in claim 1, wherein the vertical length of the shorter end pole piece is at most 2 μm and preferably at most 1 μm.

4. The magnetic head recited in claim 1, wherein the longer end pole piece extends with approximately constant width to a region in which the second magnet leg having the shorter end pole piece defines the defined space between the two magnet legs through which the turns of the write/read coil extend.

5. The magnetic head recited in claim 1, wherein the angle of inclination α of the widening leg part connected to the shorter end pole piece to the surface of the substrate is at least 40° and preferably at least 60°.

6. The magnetic head recited in claim 1, wherein an angle $\beta$ determining the widening of the leg part provided with the aperture to the center line of the leg part is at least 40° and preferably at least 60°.

7. The magnetic head recited in claim 1, wherein the magnetic conduction body comprises magnetically soft material.

8. The magnetic head recited in claim 1, wherein the magnetic conduction body comprises a material, the easy magnetization of which is directed, at least largely, perpendicularly to the conduction direction of the magnetic flux.

* * * * *